United States Patent
Park et al.

(10) Patent No.: US 8,974,646 B2
(45) Date of Patent: Mar. 10, 2015

(54) PORTABLE HYDROGEN-RICH WATER GENERATOR

(75) Inventors: Inchol Park, Gyeonggi-do (KR); Ilbong Kim, Gyeonggi-do (KR)

(73) Assignee: Ilbong Kim, Gyeonggi-do (KR)

( * ) Notice: Subject to any disclaimer, the term of this patent is extended or adjusted under 35 U.S.C. 154(b) by 322 days.

(21) Appl. No.: 13/695,907

(22) PCT Filed: Mar. 21, 2011

(86) PCT No.: PCT/KR2011/001922
§ 371 (c)(1),
(2), (4) Date: Nov. 2, 2012

(87) PCT Pub. No.: WO2011/139019
PCT Pub. Date: Nov. 10, 2011

(65) Prior Publication Data
US 2013/0043124 A1    Feb. 21, 2013

(30) Foreign Application Priority Data

May 3, 2010    (KR) ............... 20-2010-0004635 U

(51) Int. Cl.
*C25B 1/10*    (2006.01)
*C25B 9/10*    (2006.01)
(Continued)

(52) U.S. Cl.
CPC ............. *A47J 47/01* (2013.01); *C02F 1/4676* (2013.01); *C25B 1/10* (2013.01); *A23L 2/52* (2013.01);
(Continued)

(58) Field of Classification Search
CPC ............ C02F 1/4676; C02F 1/4618; C02F 2001/46185–2001/46195; C02F 9/005
USPC ........... 204/252, 263, 266, 271; 205/628–639
See application file for complete search history.

(56) References Cited

U.S. PATENT DOCUMENTS 3,870,616 A * 3/1975 Dempsey et al. .......... 204/228.5
5,911,870 A    6/1999 Hough
(Continued)

FOREIGN PATENT DOCUMENTS

CN    1206388 A    1/1999
CN    201239017 Y    5/2009
(Continued)

OTHER PUBLICATIONS

European Patent Office, European Search Report of European Patent Application No. 11777500.7, Jan. 27, 2014.
(Continued)

*Primary Examiner* — Bryan D. Ripa
*Assistant Examiner* — Brian W Cohen
(74) *Attorney, Agent, or Firm* — IP Legal Services, LLC

(57) ABSTRACT

Disclosed herein is a portable hydrogen-rich water generator that includes a separable drinking cup, an electrolytic cell which includes an anode, a cathode, a solid polymer electrolyte membrane, etc. and is disposed at the bottom of the drinking cup, a reservoir base on which the drinking cup is mounted and in which an anode reaction of the electrolytic cell is generated, a float valve which allows water to be continuously supplied at a certain water level from a water tank, and a power supply to apply direct current power to the electrolytic cell. In the portable hydrogen-rich water generator, when power is applied after putting purified water into the drinking cup and mounting the drinking cup on the reservoir base, the electrolytic cell electrolyzes the water in the reservoir base so that oxygen is generated at the anode of the reservoir base side and hydrogen is generated at the cathode of the drinking cup side, thereby allowing hydrogen gases to be dissolved in the purified water in the drinking cup within a short time with the consequence that hydrogen-rich water is produced.

2 Claims, 4 Drawing Sheets

(51) Int. Cl.
*A47J 47/01* (2006.01)
*C02F 1/467* (2006.01)
*A23L 2/52* (2006.01)
*C02F 9/00* (2006.01)
*C02F 103/02* (2006.01)

(52) U.S. Cl.
CPC ............... *C02F 9/005* (2013.01); *Y02E 60/366* (2013.01); *C02F 2103/026* (2013.01); *C02F 2201/46115* (2013.01); *C02F 2201/4617* (2013.01); *C02F 2209/42* (2013.01); *C02F 2307/10* (2013.01)
USPC ........... 204/252; 205/637; 205/628; 204/266; 204/278; 204/271

(56) References Cited

U.S. PATENT DOCUMENTS

| | | |
|---|---|---|
| 6,110,353 A | 8/2000 | Hough |
| 2002/0134691 A1 | 9/2002 | Satoh et al. |
| 2003/0089618 A1 | 5/2003 | Satoh et al. |
| 2004/0094406 A1 | 5/2004 | Sawada |
| 2004/0222106 A1 | 11/2004 | Hough |
| 2006/0196767 A1 | 9/2006 | Suzuki |
| 2011/0198236 A1 | 8/2011 | Sumita et al. |
| 2013/0056350 A1* | 3/2013 | Sin .............................. 204/230.5 |

FOREIGN PATENT DOCUMENTS

| | | | |
|---|---|---|---|
| JP | 06-086980 A | | 3/1994 |
| JP | 09-003679 A | | 1/1997 |
| JP | 10-230264 A | | 9/1998 |
| JP | 11-319829 A | | 11/1999 |
| JP | 11-319835 A | | 11/1999 |
| JP | 2000-093966 A | | 4/2000 |
| JP | 2001-520573 A | | 10/2001 |
| JP | 3275831 B2 | | 4/2002 |
| JP | 2003-088737 A | | 3/2003 |
| JP | 2004290937 A | * | 10/2004 |
| JP | 2005-111356 A | | 4/2005 |
| JP | 2005-270927 A | | 10/2005 |
| JP | 2005-329375 A | | 12/2005 |
| JP | 2006-167683 A | | 6/2006 |
| JP | 2006-239674 A | | 9/2006 |
| JP | 3821529 B2 | | 9/2006 |
| JP | 2007-283258 A | | 11/2007 |
| JP | 31046459 | * | 11/2008 |
| KR | 10-2005-0067021 A | | 6/2005 |
| KR | 10-2011-0009584 A | | 1/2011 |
| KR | 101020982 B1 | * | 3/2011 |
| KR | 10-1036381 B1 | | 5/2011 |
| WO | 2010/044272 A1 | | 4/2010 |

OTHER PUBLICATIONS

State Intellectual Property Office of China, Office Action (Notice and Search Report) of Chinese Patent Application No. 201180022475.5, Aug. 20, 2013.

* cited by examiner

PORTABLE HYDROGEN-RICH WATER GENERATOR

CROSS REFERENCE TO RELATED APPLICATIONS

This application is a National Stage Patent Application of PCT International Patent Application No. PCT/KR2011/001922 (filed on Mar. 21, 2011) under 35 U.S.C. §371, which claims priority to Korean Patent Application No. 20-2010-0004635 (filed on May 3, 2010), the teachings of which are incorporated herein in their entireties by reference.

TECHNICAL FIELD

The present invention relate to a portable hydrogen-rich water generator, and specifically includes a separable drinking cup, an electrolytic cell which includes an anode, a cathode, a solid polymer electrolyte membrane, etc. and is disposed at the bottom of the drinking cup, a reservoir base on which the drinking cup is mounted and in which an anode reaction of the electrolytic cell is generated, a float valve which allows a certain amount of water to be continuously supplied from a water tank, and a power supply to apply direct current power to the electrolytic cell. More particularly, the present invention relates to a portable hydrogen-rich water generator in which when power is applied after putting purified water into the drinking cup and mounting the drinking cup on the reservoir base, the electrolytic cell electrolyzes the water in the reservoir base so that oxygen is generated at the anode of the reservoir base side and hydrogen is generated at the cathode of the drinking cup side, thereby allowing hydrogen gases to be dissolved in the purified water in the drinking cup within a short time with the consequence that hydrogen-rich water is produced.

BACKGROUND ART

In general, so-called hydrogen-rich water which contains hydrogen in large quantities is recently known at home and abroad as being effective in preventing and treating cancers or adult diseases such as diabetes and the like and the research therefore is actively underway. Upon analyzing the hydrogen-rich water, for example, Lourdes spring water in France which is famous as miracle water, Nordenauer water in Germany which has been known as being effective since 1990, and Tlacote water in Mexico, it has developed that these are water containing dissolved hydrogen in large quantities, the concentration of the dissolved hydrogen in the hydrogen-rich water being 0.3 to 1 ppm which is a hundred times compared to the general drinking water (excerpt: "Hydrogen Water, Now is Hydrogen water age", author Dr. Chi, Eun-Sang, 2009, issued by Health Newspaper). In a medical and industrial world, a method of being capable of artificially producing the hydrogen-rich water which is effective in a variety of adult diseases has been researched.

As a typical method of producing hydrogen-rich water, there is known a method of generating hydrogen gases by electrolyzing water and dissolving the hydrogen gases in the water in order to produce the high concentration hydrogen-rich water. FIG. 1 is a view illustrating an electrolytic hydrogen water generator disclosed in Laid-Open Patent Application Publication of Korean Patent Application No. 10-2004-0110271, and the electrolytic hydrogen water generator is constituted of a water electrolytic unit 2 and a power supply 3. The water electrolytic unit 2 is provided with a reservoir 5 to store tap water as raw water 4, a water supply portion 6 to supply the reservoir 5 with the raw water 4, and a water intake portion 8 to pick out hydrogen water 7 from the reservoir 5. According to this generator, when a square wave alternating current voltage is applied to electrolytic electrodes 11, the raw water 4 in an electrolytic chamber 9 is electrolyzed, thereby to alternately generate oxygen gases 21 and hydrogen gases 22 from an anode and a cathode of the respective electrolytic electrodes 11. The electrolytic gases float from a communicating port 23 in a water purification chamber 10. In the initial stage where the electrolytic gases float, the very fine hydrogen gases are mostly adsorbed onto an activated carbon porous body 12 and forcibly filled within the activated carbon porous body 12. In this case, when the raw water 4 is supplied by opening a water supply valve 16, the electrolytic gases stored in the activated carbon porous body 12 are sucked into a water flow and forcibly dissolved in the raw water 4. Such a related art adopts a method of producing and storing the hydrogen-rich water by separately constituting a hydrogen generator, a hot and cold water purifier, etc. Accordingly, there is a problem in that manufacturing costs increase due to the complicated structure of the device and the hydrogen gases and oxygen gases generated by the electrolysis are dissolved together in the raw water. That is, a reduction process is additionally generated in which the dissolved hydrogen decisive of the concentration of the hydrogen-rich water reacts with active oxygen generated due to the transfer of electron in the dissolved oxygen and is changed into water molecules. Consequently, the concentration of the dissolved hydrogen is decreased.

Accordingly, there is a need for a portable hydrogen-rich water generator capable of having a simple structure and allowing for immediately drinking the hydrogen-rich water which is produced. Also, a measure to separate the dissolved oxygen is required so that the dissolved hydrogen and the dissolved oxygen are not mixed with each other.

DISCLOSURE

Technical Problem

Accordingly, the present invention has been made in view of the above-mentioned problem, and an object thereof is to provide a portable hydrogen-rich water generator that includes an electrolytic cell in which a cathode reaction where dissolved hydrogen is generated and an anode reaction where dissolved oxygen is generated are separated by a solid polymer electrolyte membrane and which is constituted at the bottom of a drinking cup, a reservoir base on which the drinking cup is mounted and in which the anode reaction of the electrolytic cell is generated, a water tank to supply the reservoir base with electrolytic water, and a power supply to apply direct current power to the electrolytic cell. In the portable hydrogen-rich water generator having such a simple configuration, hydrogen-rich water may be drunk immediately after being produced by separating the drinking cup from the reservoir base.

Technical Solution

In accordance with one aspect of the present invention, a portable hydrogen-rich water generator include a movable drinking cup 100; an electrolytic cell 102 at the bottom thereof, the electrolytic cell 102 including a cathode 102-1, an anode 102-2, a solid polymer electrolyte membrane 102-3, and gaskets 102-4; a cell cover 101; a reservoir base 103 on which the drinking cup 100 is able to be mounted; a water tank 104; a water supply pipe 105; a float valve 106; and a power supply 107. When purified water is put into the drinking cup 100 and the drinking cup 100 is mounted on the reservoir base 103, the cathode 102-1 of the electrolytic cell 102 at the bottom of the drinking cup 100 is submerged into the purified water in the drinking cup 100 and the anode 102-2 is submerged into water in the reservoir base. The water in the reservoir base is maintained always at a constant water level by a static water level blocking function of the float valve 106 while being supplied through the water supply pipe 105 from the water tank 104. When direct current power is applied to the electrolytic cell 102 from the power supply 107, hydrogen gases are generated at the cathode by an electrolytic reaction to be dissolved in the purified water in the drinking cup 100, and oxygen gases are generated at the anode to be dissolved in the water in the reservoir base or dissipated into an upper space in the form of gases, thereby being emitted to the outside. As a result, the purified water in the drinking cup is changed into hydrogen-rich water containing the dissolved hydrogen, and a user may drink the hydrogen-rich water by detaching the drinking cup from the reservoir base.

Advantageous Effects

As described above, a portable hydrogen-rich water generator according to the present invention has a simple structure by integrally constituting a drinking cup 100 and an electrolytic cell, without needing complicated devices required for separate processes such as a raw water supply process, a water storage process, a water intake process, etc., and generates hydrogen-rich water capable of being immediately drunk. The electrolytic cell 102 is constituted so that a cathode 102-1 at which hydrogen gases are generated and an anode 102-2 at which oxygen gases are generated are separated from each other by forming a solid polymer electrolyte membrane 102-3 as the boundary therebetween, thereby enabling a dissolved hydrogen concentration in the hydrogen-rich water to be maximized. In addition, water in a reservoir base 103 may be maintained always at a constant water level due to a simple structure of a water tank 104, a water supply pipe 105, and a float valve 106. Since an electrolytic reaction allows oxygen from the anode and oxidants such as hypochlorous acid or chlorine dioxide to be generated, the water in the reservoir base may be prevented from being contaminated.

In accordance with the present invention, the hydrogen-rich water may be generated by an economical device, a user may select an amount and concentration of the hydrogen-rich water and produce the selected hydrogen-rich water as occasion demands, and a user may drink the hydrogen-rich water immediately after producing the same by detaching the drinking cup.

Additional advantages, objects, and features of the invention will be set forth in part in the description which follows and in part will become apparent to those having ordinary skill in the art upon examination of the following or may be learned from practice of the invention.

BEST MODE FOR INVENTION

The above and other objects, features and other advantages of the present invention will be more clearly understood from the following detailed description taken in conjunction with the accompanying drawings. Reference will now be made in detail to specific embodiments of the present invention, examples of which are illustrated in the accompanying drawings.

Figure 1:
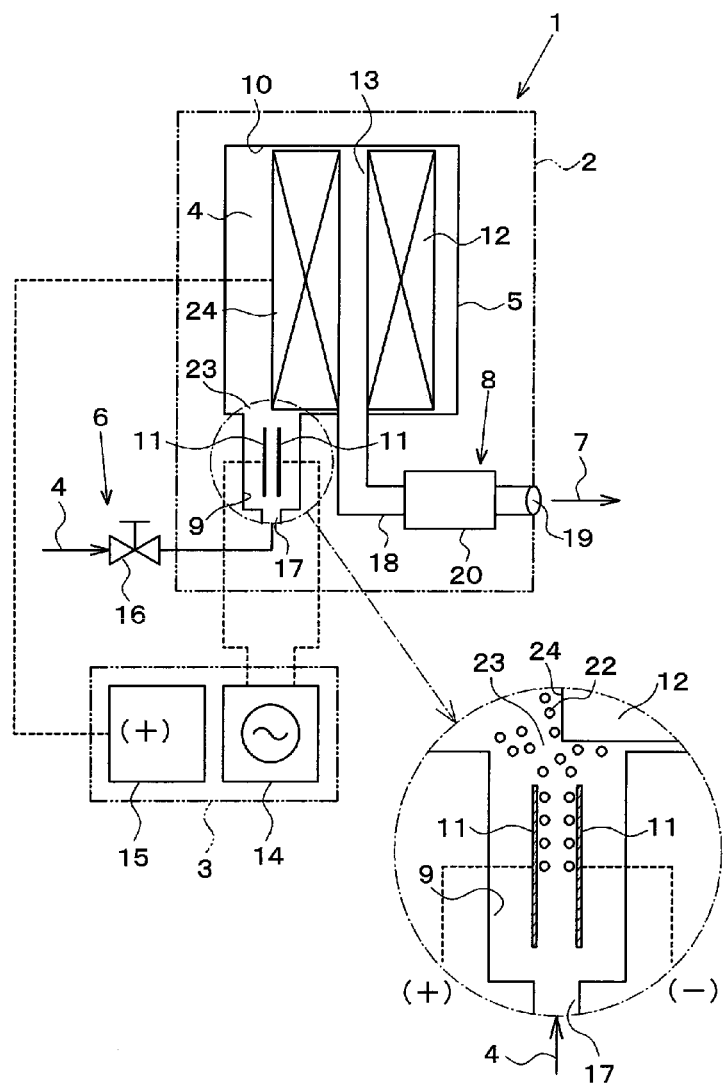
FIG. 1 is a view illustrating a configuration of an electrolytic hydrogen water generator according to the related art.
Figure 2:
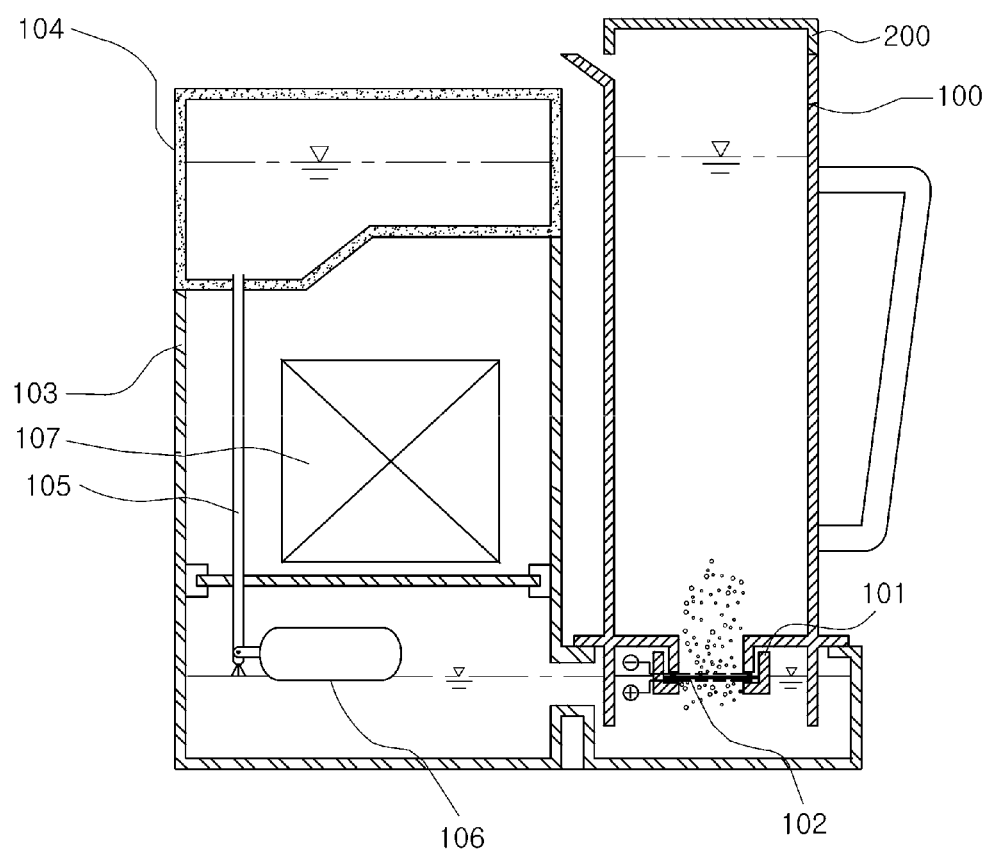
FIG. 2 is a view illustrating a configuration of a portable hydrogen-rich water generator according to an embodiment of the present invention.
Figure 3:
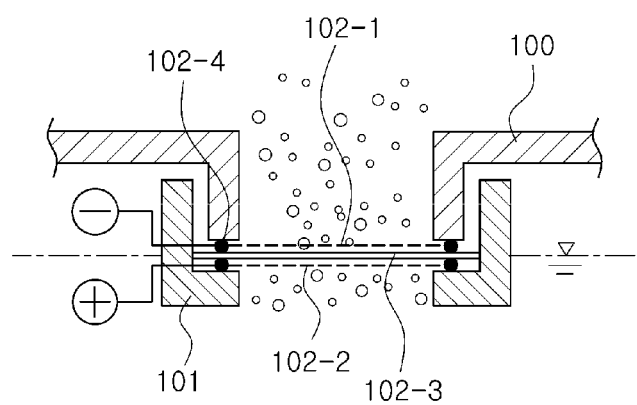
FIG. 3 is a sectional view illustrating an electrolytic cell of the portable hydrogen-rich water generator according to the embodiment of the present invention.

A portable hydrogen-rich water generator according to an embodiment of the present invention includes a drinking cup 100; an electrolytic cell 102 at the bottom thereof, the electrolytic cell 102 including a cathode 102-1, an anode 102-2, a solid polymer electrolyte membrane 102-3, and gaskets 102-4; a cell cover 101; a cup lid 200; a reservoir base 103 on which the drinking cup 100 is able to be mounted; a water tank 104; a water supply pipe 105; a float valve 106; and a power supply 107, as shown in FIG. 2. In addition, the electrolytic cell 102 is constituted so that the cathode 102-1 and the anode 102-2 are separated from each other by forming the solid polymer electrolyte membrane 102-3 as the boundary therebetween, and includes the gaskets 102-4 disposed on opposite surfaces of edges of the solid polymer electrolyte membrane 102-3. Purified water in the drinking cup 100 is not leaked by installing the cell cover 101 beneath the drinking cup 100.

An operation of the present invention will be described in detail. When purified water which is drinkable is put into the drinking cup 100, the cathode 102-1 at the bottom of the drinking cup 100 becomes a state of being submerged into the purified water in the drinking cup 100. When the drinking cup 100 is mounted on the reservoir base 103, the anode 102-2 of the electrolytic cell 102 is submerged into water in the reservoir base. At this time, the water in the reservoir base is maintained always at a constant water level by a static water level blocking function of the float valve 106 while being supplied through the water supply pipe 105 from the water tank 104. The power supply 107 generally generates direct current power which is equal to or less than dozens of voltages. When the direct current power is applied to the cathode 102-1 and the anode 102-2 of the electrolytic cell 102, the following electrolytic reaction occurs.

Anode: $2H_2O(l) = O_2(g) + 4e^- + 4H^+(aq)$

Cathode: $4H^+(aq) + 4e^- = 2H_2(g)$

Oxygen gases are generated at the anode by the reaction formula, and are dissolved in the water in the reservoir base or dissipated into an upper space in the form of gases to be emitted to the outside. In this case, chlorine components contained in the water are combined with the dissolved oxygen, thereby to generate oxidants such as hypochlorous acid or chlorine dioxide. These substances have sterilizing power, thereby preventing the water in the reservoir base 103 from being contaminated. Dissolved hydrogen ions generated in the anode reaction are moved to the cathode through the solid polymer electrolyte membrane, and receive electrons from the cathode 102-1, thereby generating hydrogen gases. The hydrogen gases are generated at the bottom of the drinking cup 100 in the form of bubbles. Because of having large solubility with respect to water, the hydrogen gases are mostly dissolved in the purified water in the middle of floating upward, with the consequence that hydrogen-rich water is generated.

Although the present invention has been described with respect to the illustrative embodiments, it will be apparent to those skilled in the art that various variations and modifications may be made without departing from the spirit and scope of the invention as defined in the following claims.

MODE FOR INVENTION

Figure 4:
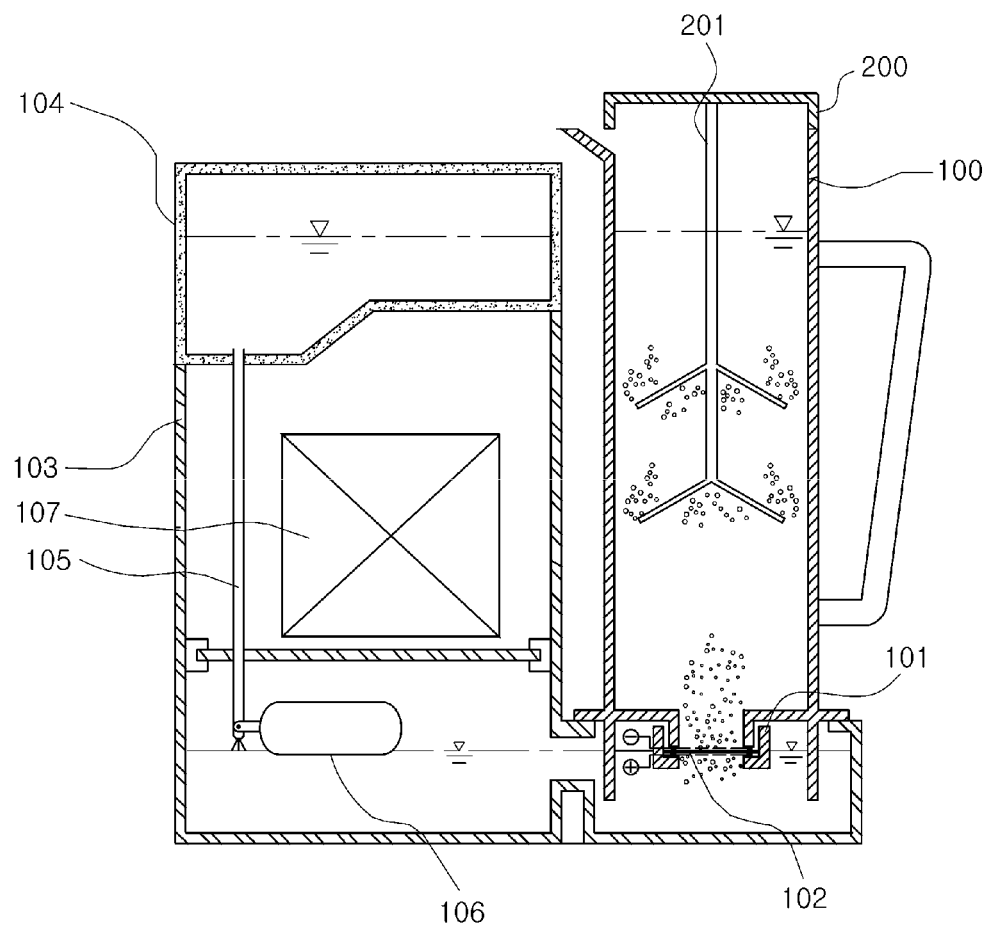
FIG. 4 is a view illustrating a configuration of a portable hydrogen-rich water generator according to another embodiment of the present invention.
2: water electrolytic unit, 3: power supply, 4: raw water
5: reservoir, 6: water supply portion, 7: hydrogen water
8: water intake portion, 9: electrolytic chamber, 11: electrolytic electrode
12: porous body, 21: oxygen gas, 22: hydrogen gas
100: drinking cup, 101: cell cover, 102: electrolytic cell
102-1: cathode, 102-2: anode, 102-3: polymer ion exchange resin membrane
102-4: gasket, 103: reservoir base, 104: water tank
105: water supply pipe, 106: float valve, 107: power supply
200: cup lid, 201: dissolution disk

As shown in FIG. 4A, a portable hydrogen-rich water generator according to another embodiment of the present invention includes a cup lid 200 and a dissolution disk 201 which is integrally with the cup lid 200, in addition to the above-mentioned configuration. When hydrogen bubbles are generated at the cathode 102-1 and float upward of the drinking cup 100, the dissolution disk 201 serves to delay a reachable time so as to increase a hydrogen dissolved concentration. The dissolution disk 201 may be formed in a conic disk shape as shown in FIG. 4.

INDUSTRIAL APPLICABILITY

It has developed that physical aging and various diseases are caused by active oxygen through many scientific researches, and active hydrogen is proven in clinical trials as serving as an antioxidant which is effective in removing the active oxygen. Consequently, a demand for active hydrogen water, namely, hydrogen-rich water is increasing. Accordingly, there is a need for a device in which hydrogen-rich water is produced simply and effectively at home, only purely active hydrogen is dissolved, and the hydrogen-rich water is drunk immediately after being produced. Accordingly, the present invention has been made in view of the above-mentioned need, and is to provide a portable hydrogen-rich water generator that includes an electrolytic cell in which a cathode reaction where dissolved hydrogen is generated and an anode reaction where dissolved oxygen is generated are separated by a solid polymer electrolyte membrane and which is constituted at the bottom of a drinking cup, a reservoir base on which the drinking cup is mounted and in which the anode reaction of the electrolytic cell is generated, a water tank to supply the reservoir base with electrolytic water, and a power supply to apply direct current power to the electrolytic cell. In the portable hydrogen-rich water generator having such a simple configuration, the hydrogen-rich water may be drunk immediately after being produced by separating the drinking cup from the reservoir base.

The invention claimed is:

1. A portable hydrogen-rich water generator for generating hydrogen gases by electrolyzing water and producing hydrogen-rich water, comprising:
   a drinking cup;
   an electrolytic cell at the bottom of the drinking cup;
   a reservoir base;
   a cell cover; and
   a cup lid,
   wherein the electrolytic cell is constituted so that a cathode and an anode are separated from each other by a solid polymer electrolyte membrane as the boundary therebetween, and includes gaskets disposed on opposite surfaces of edges of the solid polymer electrolyte membrane,
   wherein purified water in the drinking cup is not leaked by installing the cell cover beneath the drinking cup,
   wherein the drinking cup is mounted on the reservoir base such that the drinking cup comprising the electrolytic cell is configured to be separated from the reservoir base, and electrolytic water is supplied to the reservoir base through a water supply pipe, which communicates with the reservoir base and a water tank, and a float valve while being maintained at a constant water level, and
   wherein direct current power is applied to the cathode and the anode from a power supply.

2. The portable hydrogen-rich water generator according to claim 1, further comprising:
   a dissolution disk which is integrally formed with the cup lid.

* * * * *